United States Patent
Hallenstal

Patent Number: 6,144,663
Date of Patent: Nov. 7, 2000

[54] SCREENING OF UNFAMILIAR MESSAGES AND PARAMETERS

[75] Inventor: Magnus Hallenstal, Täby, Sweden

[73] Assignee: Telefonaktiebolaget LM Ericsson, Stockholm, Sweden

[21] Appl. No.: 08/903,091

[22] Filed: Jul. 30, 1997

[30] Foreign Application Priority Data

Jul. 30, 1996 [SE] Sweden .................................. 9602899

[51] Int. Cl.[7] ................................................ H04L 12/46
[52] U.S. Cl. ............................................ 370/392; 370/401
[58] Field of Search ..................................... 370/241, 242, 370/392, 400, 401, 402, 466, 467, 384, 385, 410; 379/220, 229, 230

[56] References Cited

U.S. PATENT DOCUMENTS

| 5,062,108 | 10/1991 | Bales et al. | 370/110.1 |
| 5,539,817 | 7/1996 | Wilkes | 370/410 |
| 5,640,446 | 6/1997 | Everett et al. | 370/467 |
| 5,642,396 | 6/1997 | Cowgill | 370/252 |
| 5,706,286 | 1/1998 | Reiman et al. | 370/467 |
| 5,768,361 | 6/1998 | Cowgill | 370/385 |
| 5,852,660 | 12/1998 | Lindquist et al. | 370/401 |

FOREIGN PATENT DOCUMENTS

| 0 517 534 | 6/1992 | European Pat. Off. | H04L 12/46 |
| 0 595 509 | 10/1993 | European Pat. Off. | H04L 12/40 |
| 2268376 | 1/1994 | United Kingdom | H04L 12/46 |

*Primary Examiner*—Min Jung
*Attorney, Agent, or Firm*—Burns, Doane, Swecker & Mathis, L.L.P.

[57] ABSTRACT

The present invention relates to a method, a node (105) and a network (102) for screening out unfamiliar messages. The invention is preferably applied in a ISUP network. The screening takes place through when a message or a parameter is detected which is not recognized a function is called upon which looks up the message and destination in a table (401, 601). The table (401, 601) is built up and modified by the operator. If the parameter (603) or message (403) and destination (404, 604) are found in the table then the corresponding action (405, 605) which can be, for example, to not forward the message or parameter, is taken.

14 Claims, 4 Drawing Sheets

| MESSAGES | DESTINATION | ACTION |
|----------|-------------|---------|
| Msg 1 | Sth | DISCARD |
| Msg 1 | Gbg | FORWARD |
| Msg 1 | Mlm | DIVERT |
| Msg 2 | Sth | FORWARD |
| | | |
| | | |
| Default | All | DISCARD |

FIG. 4

SCREENING OF UNFAMILIAR MESSAGES AND PARAMETERS

BACKGROUND OF THE INVENTION

1. Field of the Invention

The present invention relates to a method, and a node and a network, for screening out unfamiliar messages and parameters.

2. Background Information

A telecommunication network includes gateway nodes which have the task of communicating with other surrounding networks. In a gateway node there is a need to be able to check which information is conveyed between different networks via the gateway node. This can include, for example, traffic conveyed by ISUP (Integrated Services User Part). ISUP is extremely information rich and exists in a couple of different versions. Furthermore, each version has a number of different national and operator-specific variants. This means there is a large risk that unfamiliar messages or parameters will come to a gateway node from a surrounding network.

There is a possibility in ISUP for the transmitter of a message to set a compatibility parameter. The parameter controls what a node shall do with a message or a parameter which it does not recognize. This means, however, that a long distance operator loses control over which messages and parameters he can convey in his network, because he must rely on those who send messages to set the parameters in a correct manner.

For a long distance operator it is especially important to solve this problem. In order to have a check on which services the operator wants to convey between two networks, the operator must recognize all the messages and parameters which arrive at the gateway nodes. A contributory reason for wanting to recognize all messages is, for example, to be able to track and document for accounting and debit purposes a customer's use of the long distance operator's network. If any of the long distance operator's customers chooses to update his network in order to institute new services then the long distance operator must follow along. Upgrading software in a telecommunication network is a slow process which means that the long distance operator will irremediably fall behind. But not even through upgrading can the long distance operator be certain to identify and debit for every message and parameter, because the operator's customers can use a variation of the protocol which is not known or available to the long distance operator.

From U.S. Pat. No. 5,062,108 it is known for a system to have stored data in order to identify and process messages. The system determines if a message uses a different number of identifiers. If this is the case, then the message is converted to a recognizable form.

ISUP also handles unfamiliar messages and parameters. This is done by reading and interpreting a compatibility parameter which is sent with the message. If there is no compatibility parameter sent with the message, then a predetermined action is taken. For example, the unfamiliar message or parameter is forwarded. This predetermined action applies for all messages or parameters.

Screening of known messages is known.

SUMMARY OF THE INVENTION

The present invention addresses the problem stated above of how to screen unfamiliar messages and parameters in a network.

Another problem which the present invention solves is to enable a network operator to be paid for unfamiliar services conveyed via the network.

An object of the present invention is consequently to be able to screen and terminate selected unfamiliar messages and parameters.

The above problem of screening unfamiliar messages and parameters is solved through a special screening method that is used when a unfamiliar message or parameter is encountered.

The screening method uses a table with parameters or message types, and destinations and actions. When a parameter or a message is encountered which is intended to be conveyed to a destination mentioned in the table, then a corresponding action indicated in the table is performed. The table is set up by an operator and can be manipulated by the operator.

An exemplary advantage conferred by the present invention is that it enables a network operator to check messages or parameters being conveyed via his network.

Another exemplary advantage is that different actions can be performed, based on different types of unfamiliar messages and different message parameters, and also on a destination of the messages.

Another exemplary advantage is that the network operator can easily and simply adapt his network to new conditions, such as new types of unfamiliar messages and parameters.

Another exemplary advantage is that the network operator can charge or debit those entities who use his network.

The invention will now be described in greater detail with reference to the appended drawings.

BRIEF DESCRIPTION OF THE DRAWINGS

FIG. 4 shows a table in accordance with an exemplary embodiment of the invention.

DETAILED DESCRIPTION OF THE PREFERRED EMBODIMENTS

Figure 1:
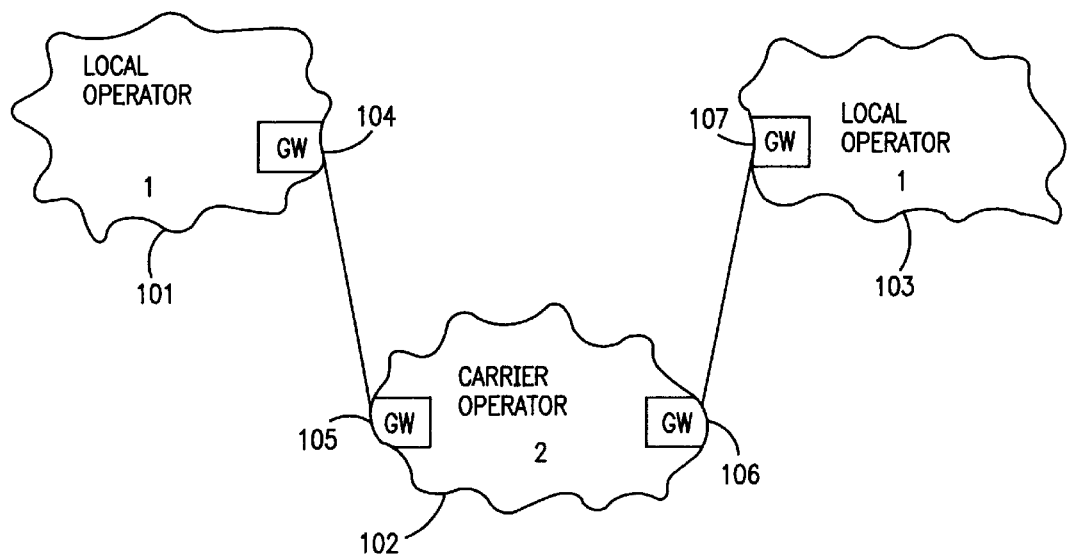
FIG. 1 is a schematic diagram of three networks.

FIG. 1 shows a network including a local operator with two separate networks 101 and 103. These networks are joined through a third network 102. In the network 101 a message originates which shall terminate in the network 103. The message passes through a gateway node 104 in the network 101 and arrives at a gateway node 105 in the network 102. In the gateway node 105 the message is unpacked and analyzed. When the logic in the gateway node 105 does not recognize the message, a decision must be made whether to forward the message to the network 103 via the gateway nodes 106 and 107.

In this embodiment the network protocol is preferably ISUP, but the invention. However, the invention functions naturally also with other protocols, for example TUP, MUP, etc. Completely different types of protocol can also be used, for example TCP/IP, X.25, etc.

Figure 3:
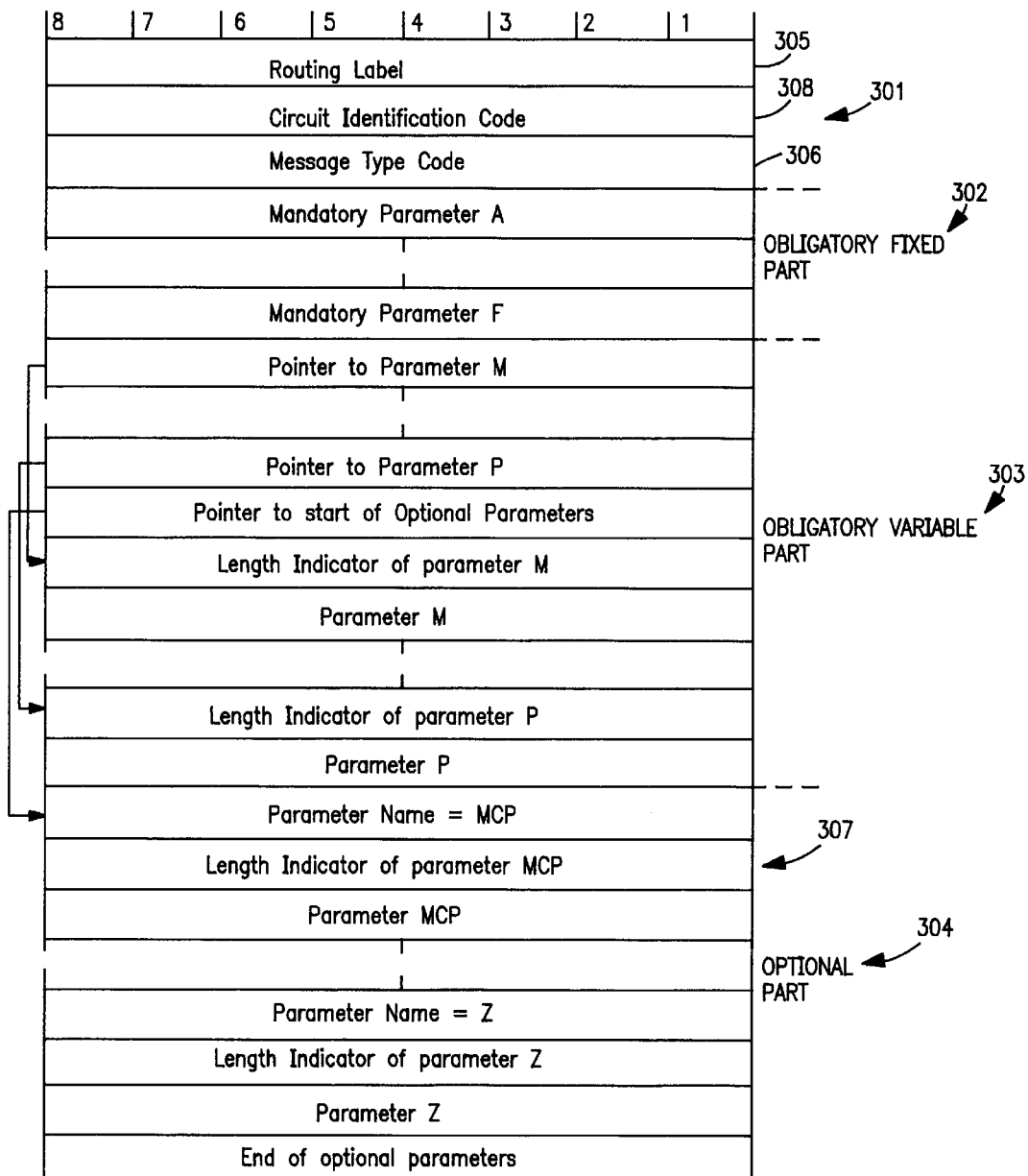
FIG. 3 shows schematically an ISUP message.

In FIG. 3 an ISUP message is shown schematically. The ISUP message is divided into four parts, a head 301, an obligatory fixed part 302, an obligatory variable part 303 and an optional part 304. Each part is in turn divided into 8 bit fields. In the head are for example a routing label 305 and a message type code 306. In the optional part there is included amongst others a message compatibility parameter, abbreviated here to MCP 307. MCP is the parameter in ISUP which decides what shall happen with a message if it is not recognized.

In the first ISUP message, IAM (initial address message) information is sent about the destination for the conversation in the parameter "called party number". In all subsequent messages the message and destination are identified with the help of the parameter "Routing Label" 305 and a parameter "Circuit Identification Code" 308.

Figure 2:
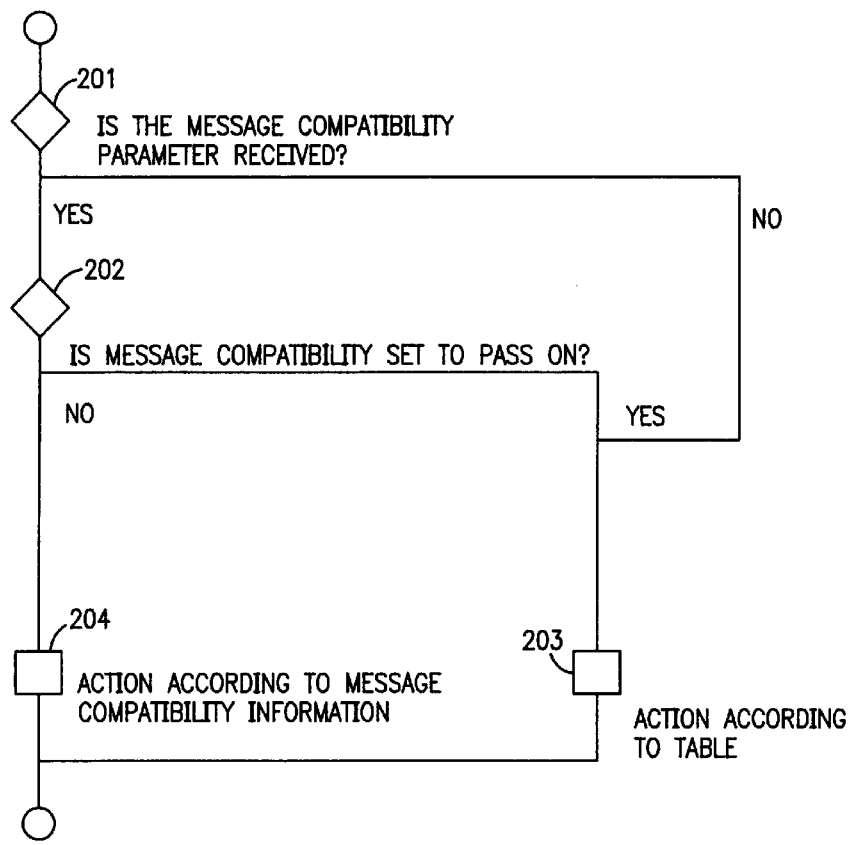
FIG. 2 shows a flow diagram in accordance with an exemplary embodiment of the invention.

When a message arrives at the gateway node 105 in FIG. 1 and is not recognized, then the message is analyzed according to the flow diagram shown in FIG. 2. In FIG. 2, if at step 201 the message does not contain any MCP, then control passes to step 203 where actions are taken according to a table 401 shown in FIG. 4.

In the table 401 there are three fields for every input 402. A field 403 for the type of message, a field 404 for the destination of the message, and a field 405 containing an action to be performed. If the message type 403 and the destination 404 are in the table then the corresponding action 405 is performed. For example, referring to FIG. 4, if the message type 403 is Msg1 and the destination is Sth, then the message is discarded. The table can be modified by an operator, for example to add new message types and destinations and corresponding actions. In this way new types of messages can be treated or accommodated in a simple manner through the operator adding them to the table. The table can be initially built up by an operator.

FIG. 2 further illustrates that if in step 201 it is determined that the message contains an MCP, and then in step 202 it is determined that the message shall be forwarded, then control passes to step 203 where a corresponding action indicated by the Table 401 is performed. If in step 202 it is determined that the MCP is not set, indicating that the message shall not be forwarded, then control passes to step 204 where an action corresponding to the MCP is performed. These actions are described in the ISUP standardization document, Q.763. At this stage the type of message, destination, action and other interesting or relevant traffic information can be saved so that debiting for the communication can be performed later. To be able to debit even for unfamiliar messages and parameters is naturally of great interest to network operators.

Figures 5, 6:
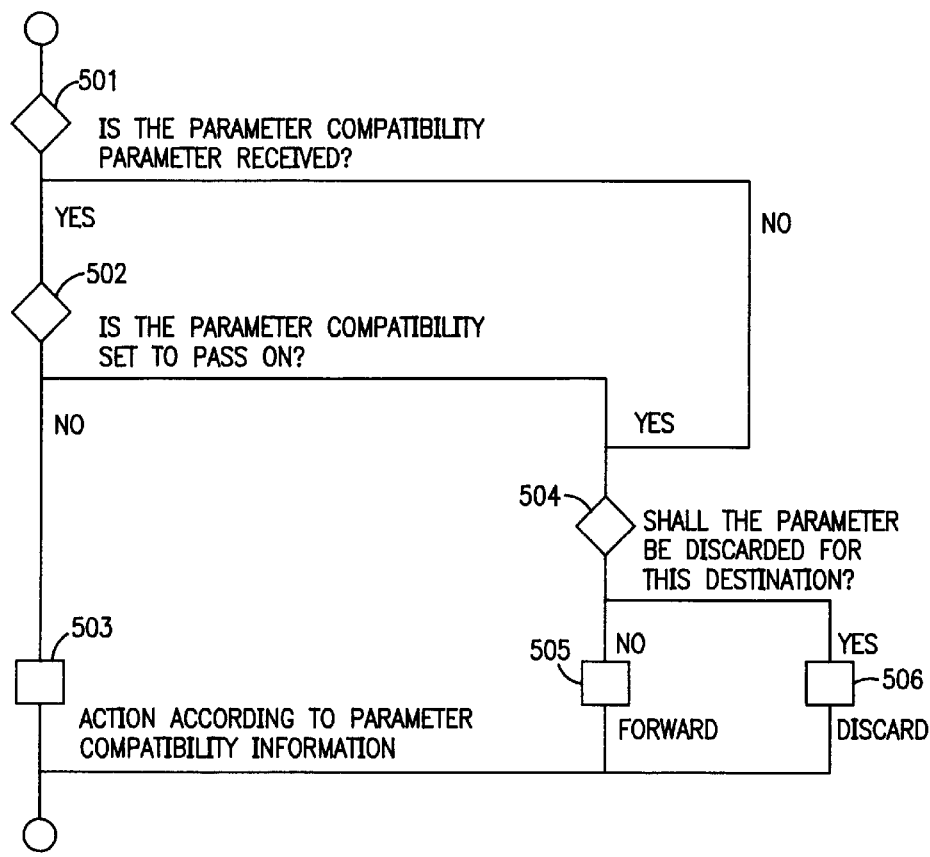
FIG. 5 shows a flow diagram in accordance with an exemplary embodiment of the invention.
FIG. 6 shows a table in accordance with an exemplary embodiment of the invention.

In this way it is determined in the gateway node 105 shown in FIG. 1 whether an unfamiliar message shall be forwarded to the network 103 via the gateway nodes 106 and 107. If the message is recognized in the gateway node 105, then the analysis continues using the parameters 302, 303 and 304 shown in FIG. 3 and contained in the message. If any of these is discovered to be unfamiliar then the method illustrated in FIG. 5 is used. This method is similar to that for the unknown message.

When a message arrives at the gateway node 105 in FIG. 1 and it is discovered that the message includes an unfamiliar parameter, then the message is checked to see whether it also includes a PCP (Parameter Compatibility Parameter) as shown in step 501 in FIG. 5. The PCP can be located in the variable part 304 of the ISUP message shown in FIG. 3. The PCP contains information on which actions a node shall take if the node does not recognize the unfamiliar parameter. If in step 501 it is determined that the PCP has not been received, or if in step 502 it is determined that the PCP is set to a forwarding parameter, then control proceeds to step 504. In step 504 it is determined whether the parameter shall be forwarded to the destination which the message is intended for. If yes, then control proceeds to step 505 where the message is forwarded. If no, the control proceeds from step 504 to step 506 where the message is discarded.

If the PCP is received and it is not set to pass on, then control proceeds from step 502 to step 503, where an action corresponding to the PCP is performed. For example, information on whether the unfamiliar parameter should be forwarded or not to a given destination, is contained in a table 601 shown in FIG. 6. Each input 602 in the table 601 contains information 603 on the type of parameter, a destination 604 and an indication 605 as to whether it shall be forwarded or not. Even in this case interesting traffic information can be saved, for example the type of parameter, destination, etc.

That one type of flow diagram and table is shown for the message and another type for the parameters does not mean that the respective flow diagrams and tables are particularly intended for respective messages and parameters, but the intention is only to show two similar embodiments of the invention. The flow diagram and table for the message, function equally well for the parameters, and vice versa.

The invention is naturally not limited to the embodiment described above and shown in the drawings, but can be modified within the scope of the accompanying claims.

What is claimed is:

1. Method for preventing or allowing the conveyance of at least one message via a node in a network, the node comprising first and second screening functions, each at least one message comprising a first parameter with information on a type of the message, at least one of the at least one message further comprising a second parameter with information about a destination for the at least one message, wherein when the at least one message arrives at the node and the first screening function does not recognize the type of message indicated by the first parameter, the first screening function calls upon a second screening function, which performs an action based on the destination indicated by the second parameter.

2. Method according to claim 1, the at least one message further comprising at least a third parameter, wherein when the first screening function fails to recognize all parameters in the message, the first screening function calls upon the second screening function, which performs an action based on the destination and the third parameter.

3. Method according to claim 2, wherein the third parameter comprises a parameter type and the second screening function comprises an action table including entries, each entry comprising a parameter type, a destination and an action corresponding to the parameter type and the destination, third parameter and said destination the corresponding action described in the table is the table being arranged so that an operator can add entries to the table.

4. Method according to claim 3, wherein the action in each entry is one of terminating the message, forwarding the message, and forwarding the message with the third parameter excluded.

5. Method according to claim 4, further comprising the steps of calculating the number of unfamiliar parameters and messages, storing the number of unfamiliar parameters and messages and storing traffic information related to the parameters and messages.

6. Method according to claim 5, wherein:

the protocol which is used for the messages is ISUP (Integrated Services User Part), the information on the type of message is carried in the field for "Message Type Code", the third parameter comprises a "Parameter Compatibility Parameter", information on the destination is received through "Called Party Number" in the message IAM (Initial Address Message), and the corresponding action described in the table is performed depending on whether the "Parameter Compatibility Parameter" has been received or on whether the Parameter Compatibility Parameter is set to "Pass On".

7. Method according to claim 1, wherein:

the second screening function comprises an action table having entries, each entry comprising a message type, a destination and an action, new entries in the table are added by an operator, and when the first parameter and the second parameter of the message match the message type and the destination of an entry in the action table, the action of the entry is performed.

8. Method according to claim 7, wherein the action in each entry is one of terminating the message, forwarding the message, and modifying the message.

9. Method according to claim 8, further comprising the steps of counting the number of unfamiliar messages, storing the number of unfamiliar messages and storing traffic information related to the messages.

10. Method according to claim 9, wherein:

the protocol which is used for the messages is ISUP (Integrated Services User Part), the information on the type of messages is carried in the field for "Message Type Code", the message comprises a "Message Compatibility Parameter", the information on the destination is obtained through the "Called Party Number" in the message IAM (Initial Address Message), and an action according to the table is performed depending on whether the "Message Compatibility Parameter" has been received or whether the "Message Compatibility Parameter" is set to "Pass On".

11. A node in a network arranged for preventing or allowing the conveyance of at least one message via the node, the node comprising first and second screening functions, each at least one message comprising a first parameter with information on a type of the message, and at least one of the at least one message further comprising a second parameter with information about a destination for the at least one message, wherein when the at least one message arrives at the node and the first screening function does not recognize the type of message indicated by the first parameter, the first screening function calls upon a second screening function, which performs an action based on the destination indicated by the second parameter.

12. Node according to claim 11, wherein the at least one message further comprises at least a third parameter, and when the first screening function fails to recognize all parameters in the message, the first screening function calls upon the second screening function, which performs an action based on the destination and the third parameter.

13. Node according to claim 12, wherein the third parameter comprises a parameter type and the second screening function comprises an action table including entries, each entry comprising a parameter type, a destination and an action corresponding to the parameter type and the destination.

14. Node according to claim 13, wherein the action in each entry is one of terminating the message, forwarding the message, and forwarding the message with the third parameter excluded.

* * * * *